(12) United States Patent
Minton et al.

(10) Patent No.: US 8,333,249 B1
(45) Date of Patent: Dec. 18, 2012

(54) PORTABLE FIELD ROLLER DEVICE

(76) Inventors: Herman E. Minton, Anthony, FL (US); William Jeffrey Minton, Ocala, FL (US)

( * ) Notice: Subject to any disclaimer, the term of this patent is extended or adjusted under 35 U.S.C. 154(b) by 48 days.

(21) Appl. No.: 13/071,175

(22) Filed: Mar. 24, 2011

(51) Int. Cl.
*A01B 5/00* (2006.01)
*A01B 49/02* (2006.01)

(52) U.S. Cl. ................................ 172/170; 172/540

(58) Field of Classification Search ............ 172/170, 172/311, 518, 540, 799.5, 662, 536, 240, 172/278, 780, 718; 280/769, 456 R; 111/178; 404/125, 122
See application file for complete search history.

(56) References Cited

U.S. PATENT DOCUMENTS

| | | | |
|---|---|---|---|
| 2,833,105 A * | 5/1958 | Naery | 56/228 |
| 4,168,750 A * | 9/1979 | Combs | 172/311 |
| 4,193,457 A | 3/1980 | Sphar | |
| 4,360,215 A * | 11/1982 | Nohl et al. | 280/413 |
| 4,389,799 A | 6/1983 | Norton et al. | |
| 4,442,662 A * | 4/1984 | Jennings | 56/228 |
| 4,569,296 A * | 2/1986 | Miller et al. | 111/123 |
| D296,198 S | 6/1988 | Buchanan | |
| 4,986,064 A * | 1/1991 | Ermacora | 56/228 |
| 5,191,942 A * | 3/1993 | Bussiere | 172/286 |
| 6,119,788 A * | 9/2000 | Bernier | 172/311 |
| 6,119,792 A * | 9/2000 | Almer | 172/799.5 |
| 6,209,297 B1 * | 4/2001 | Yeomans et al. | 56/228 |
| 6,539,697 B2 | 4/2003 | Burk | |
| 6,968,907 B1 | 11/2005 | Raper et al. | |
| 7,021,397 B2 * | 4/2006 | Pitonyak et al. | 172/662 |
| 7,562,517 B1 | 7/2009 | Kornecki | |
| 7,926,249 B1 * | 4/2011 | Cook | 56/228 |
| 8,025,312 B1 * | 9/2011 | Honas et al. | 280/769 |
| 2008/0314605 A1 * | 12/2008 | Degelman et al. | 172/311 |
| 2011/0265699 A1 * | 11/2011 | McCrea et al. | 111/178 |

* cited by examiner

*Primary Examiner* — Arpad Fabian-Kovacs

(57) ABSTRACT

A roller device having an elongated tank and a tank frame for supporting the tank. A center axle traverses the tank. The first end of the center axle engages the third side portion of the tank frame and the second end of the center axle engages the fourth side portion of the tank frame. The tank can roll about the center axle. The device also features two retractable wheels, which are attached to the frame via wheel braces. The wheel braces are each operatively connected to hydraulic arms. The hydraulic arms function to retract and extend the wheels with respect to the frame, raising and lowering the tank away from and onto the ground surface. A first tow is disposed on the third side portion of the tank frame and a second tow is disposed on the first side portion of the tank frame.

11 Claims, 6 Drawing Sheets

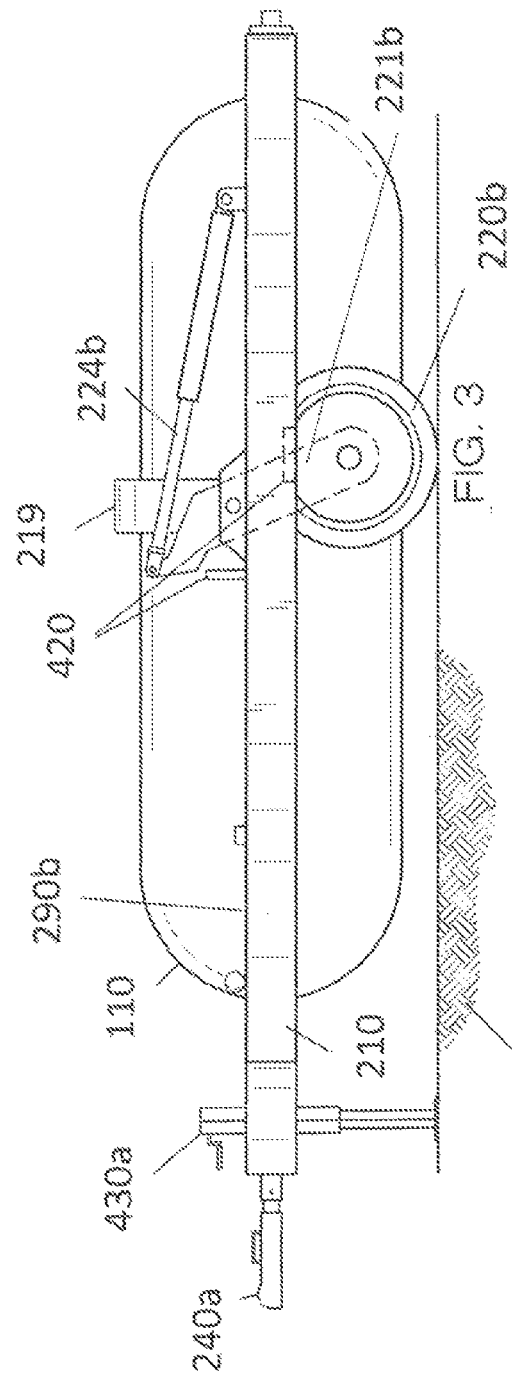
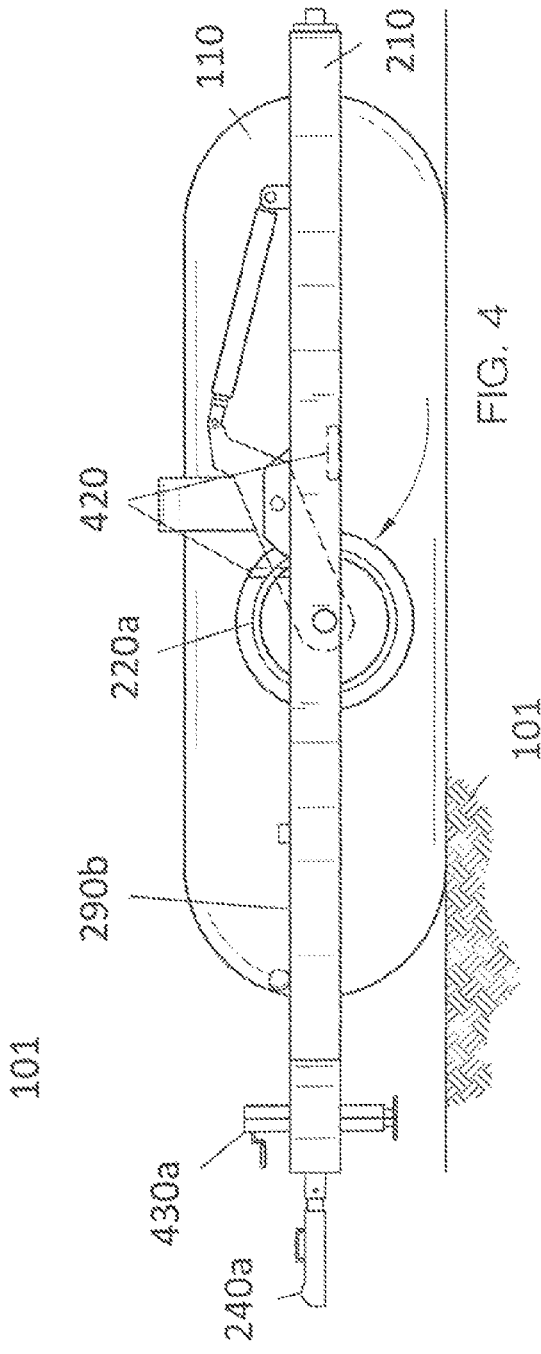

PORTABLE FIELD ROLLER DEVICE

FIELD OF THE INVENTION

The present invention is directed to a device for field rolling for improving crop yields.

BACKGROUND OF THE INVENTION

Land rolling is a common agricultural practice. The present invention features a novel portable field roller device. The device of the present invention can help stop wind erosion and help retain moisture and nutrients in soil. In some embodiments, the device of the present invention can help stop or reduce the growth of pigweed (e.g., *Amaranthus palmeri* (Palmer amaranth)) and improve crop yield.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

In summary, the present invention features a portable field roller device 100. In some embodiments, the device 100 comprises an elongated tank 110 having a first end and a second end; a tank frame 210 for supporting the tank 110, the tank frame 210 surrounds side portions of the tank 110, the tank frame 210 has a first side portion 210a, a second side portion 210b, a third side portion 210c, and a fourth side portion 210d; a center axle 230 traverses the tank 110 from the first end to the second end, the first end of the center axle 230 engages the third side portion 210c of the tank frame 210 and the second end of the center axle 230 engages the fourth side portion 210d of the tank frame 210, the tank 110 can roll in at least a first direction toward the first side portion 210a of the tank frame 210 and second direction toward the second side portion 210b of the tank frame 210 about the center axle 230; a first retractable wheel 220a connected to the first side portion 210a of the tank frame 210 via a first wheel brace 221a, the first wheel brace 221a being pivotally attached to the first side portion 210a of the tank frame 210, and a second retractable wheel 220b connected to the second side portion 210b of the tank frame 210 via a second wheel brace 221b, the second wheel brace 221b being pivotally attached to the second side portion 210b of the tank frame 210; a first hydraulic cylinder arm 224a operatively connected to the first wheel brace 221a, and a second hydraulic cylinder arm 224b operatively connected to the second wheel brace 221b, the hydraulic cylinder arms 224 function to move the respective retractable wheels 220 between an extended position and a retracted position, when the retractable wheels 220 are in the extended position the tank 110 is raised a distance above a ground surface and when the retractable wheels 220 are in the retracted position the tank 110 rests on the ground surface; a first tow extending from the third side portion of the tank frame 210; and a second tow disposed on the first side portion 210a of the tank frame 210.

In some embodiments, the tank 110 is generally cylindrical. In some embodiments, the portable field roller device further comprises cross supports 212 for helping provide stability and durability to the tank frame 210. In some embodiments, the portable field roller device further comprises cross braces 214 for helping to support the tank 110 within the tank frame 210. In some embodiments, the second tow 240b is fold-up-style tow. In some embodiments, the portable field roller device further comprises a dog house 219 extending across the tank frame 210 from the first side portion 210a to the second side portion 210b.

In some embodiments, the portable field roller device further comprises a first tow bar storage component 290a is disposed on the first side portion 210a of the frame 210. In some embodiments, the portable field roller device further comprises a second tow bar storage component 290b is disposed on the first side portion 210a of the frame 210. In some embodiments, the portable field roller device further comprises a first jack 430a disposed on the third side portion 210c of the frame 210 near the first hitch 240a. In some embodiments, the first jack 430a is a wind up retractable jack. In some embodiments, the portable field roller device further comprises a second jack 430b disposed on the first side portion 210a of the frame 210.

BRIEF DESCRIPTION OF THE DRAWINGS

FIG. 3 is a first side view of the field roller device of FIG. 1, wherein the retractable wheels are in an extended position.

FIG. 4 is a first side view of the field roller device of FIG. 1, wherein the retractable wheels are in the retracted position.

DESCRIPTION OF PREFERRED EMBODIMENTS

Referring now to FIGS. 1-7, the present invention features a novel portable field roller device 100. Without wishing to limit the present invention to any theory or mechanism, it is believed that the field roller device 100 of the present invention can help stop wind erosion, can help retain moisture and nutrients in soil, can help stop or reduce the growth of pigweed (e.g., *Amaranthus palmeri* (Palmer amaranth)), and/or can help improve crop yield.

Figure 1:
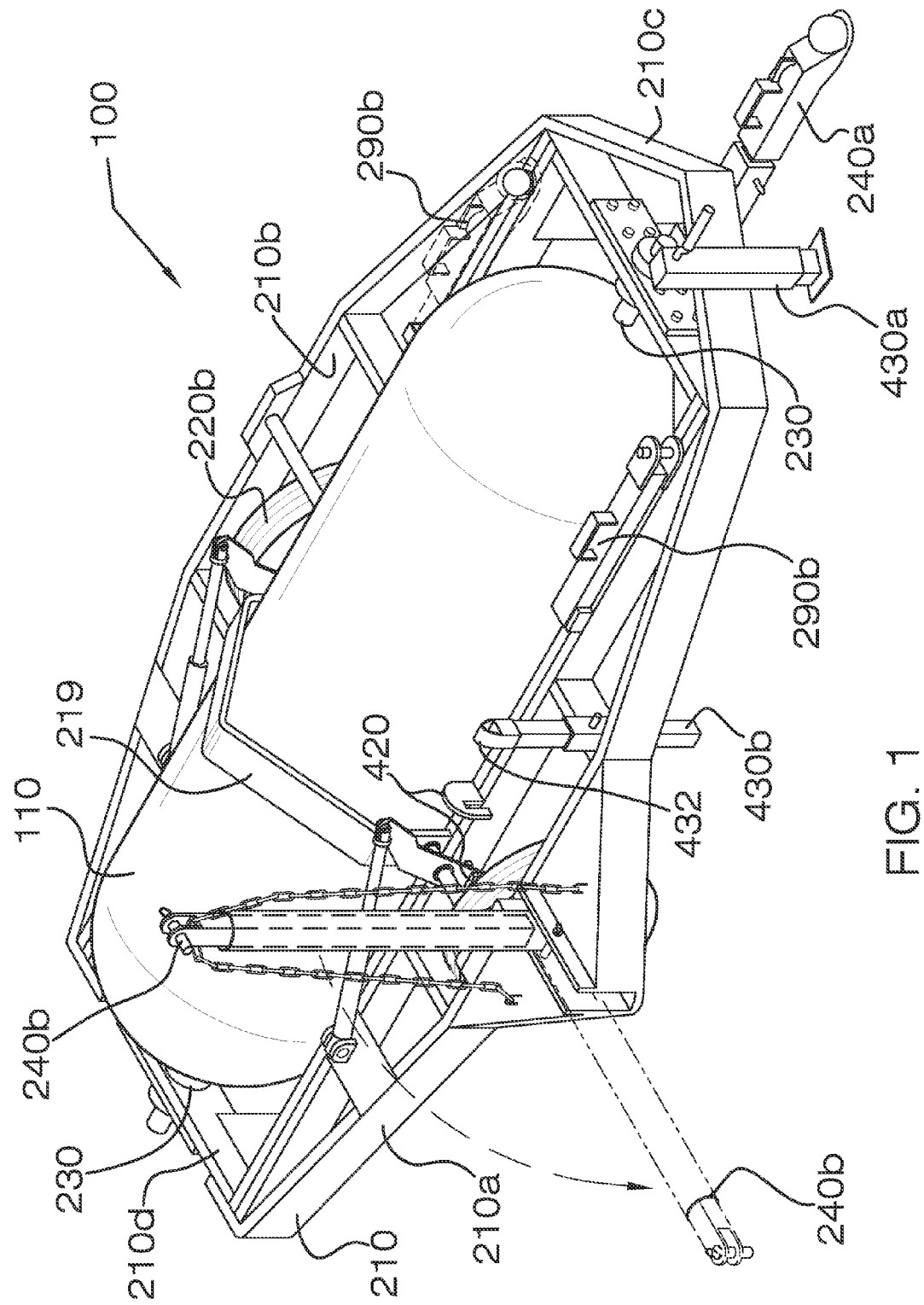
FIG. 1 is a front perspective view of the field roller device of the present invention.

As shown in FIG. 1, the roller device 100 of the present invention comprises a tank 110 supported in a tank frame 210. The tank 110 may be elongated, having a first end and a second end. The tank 110 may be generally cylindrical. Such tanks are commonly used for land rolling. The tank frame 210 surrounds the tank 110 (e.g., the side portions of the tank 110). The tank frame 210 generally has a first side portion 210a, a second side portion 210b, a third side portion 210c, and a fourth side portion 210d (the second side portion being opposite the first side portion and the fourth side portion being opposite the third side portion). The tank frame 210 may be constructed in a variety of shapes and configurations. For example, in some embodiments, the tank frame 210 comprises cross supports 212 for helping provide stability and durability to the tank frame 210, the cross supports 212 being in the corners of the tank frame 210 (e.g., see FIG. 2). In some embodiments, the tank frame 210 comprises cross braces 214 for helping to support the tank 110 within the frame 210 (see FIG. 1, FIG. 5).

Figure 2:
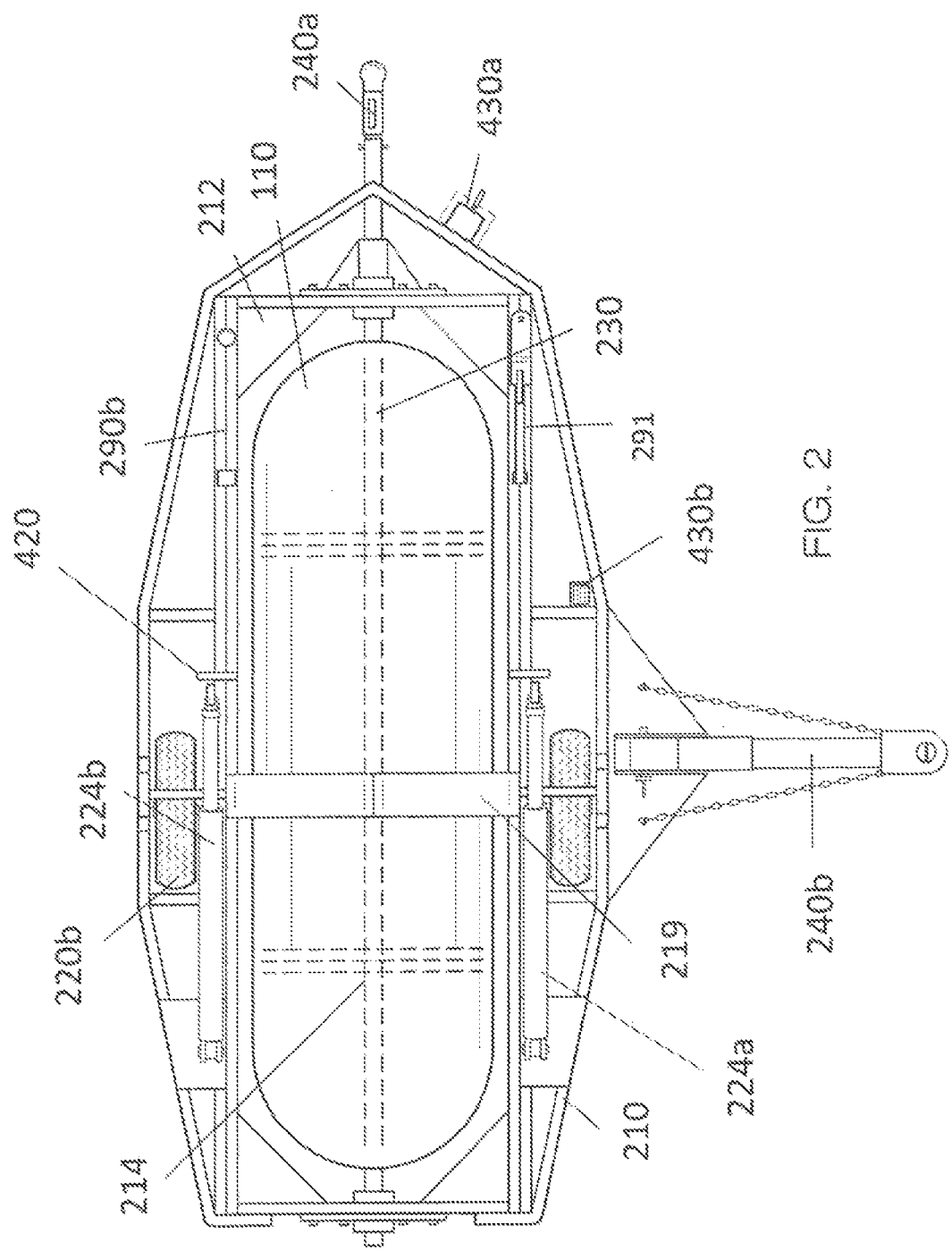
FIG. 2 is a top view of the field roller device of FIG. 1.
Figure 5:
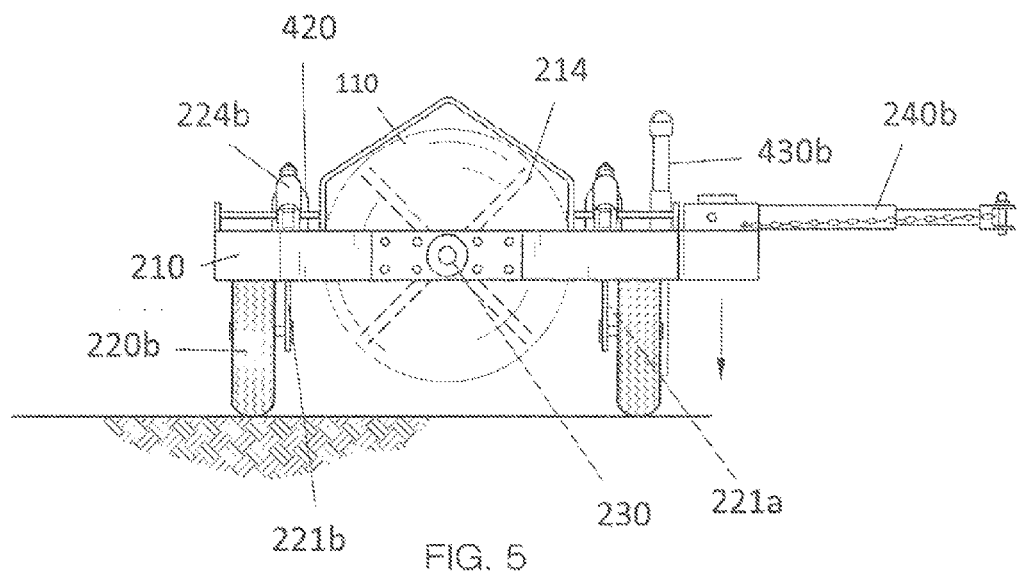
FIG. 5 is a second side view of the field roller device of FIG. 1.
Figure 6:
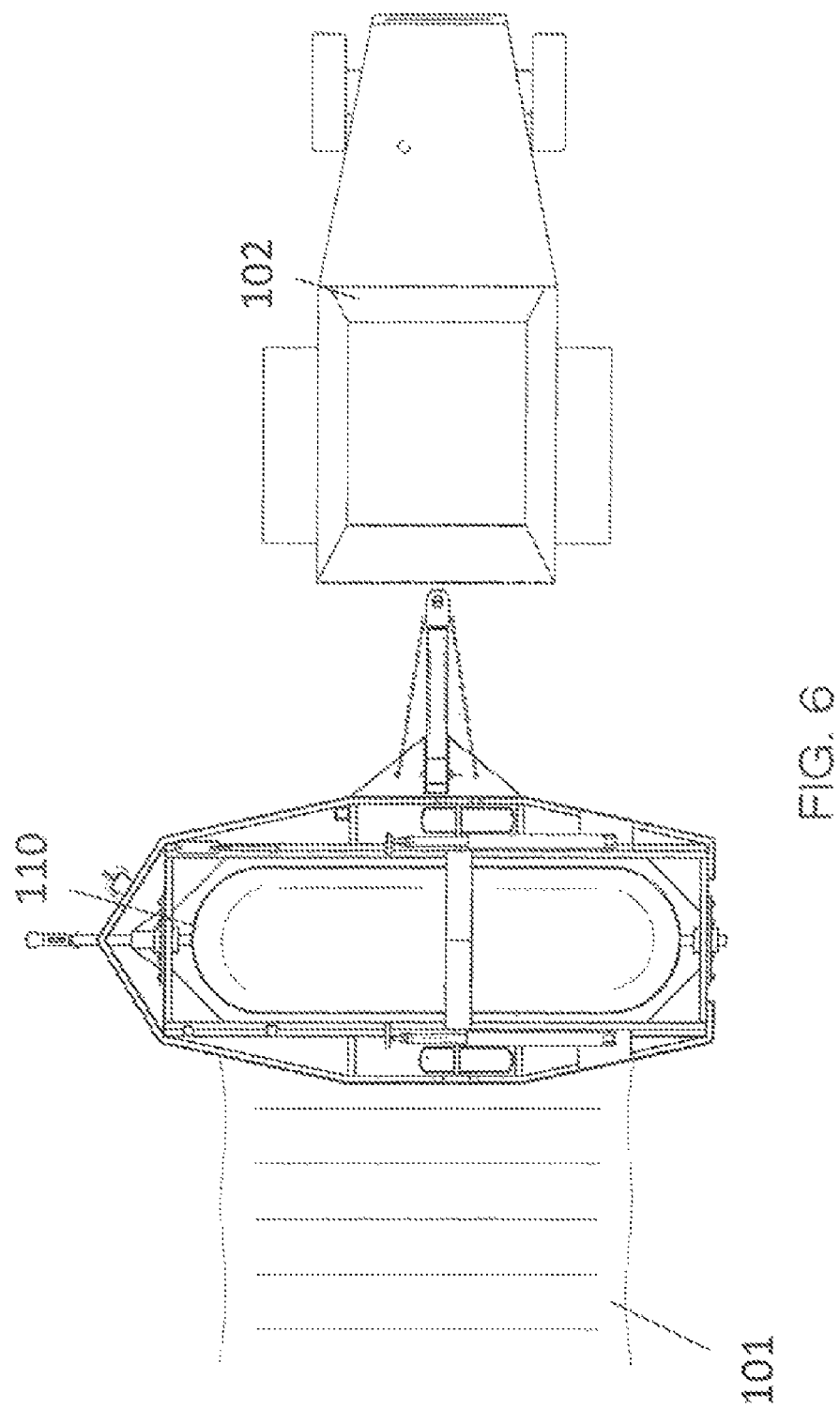
FIG. 6 is an in-use view of the field roller device of the present invention.
Figure 7:
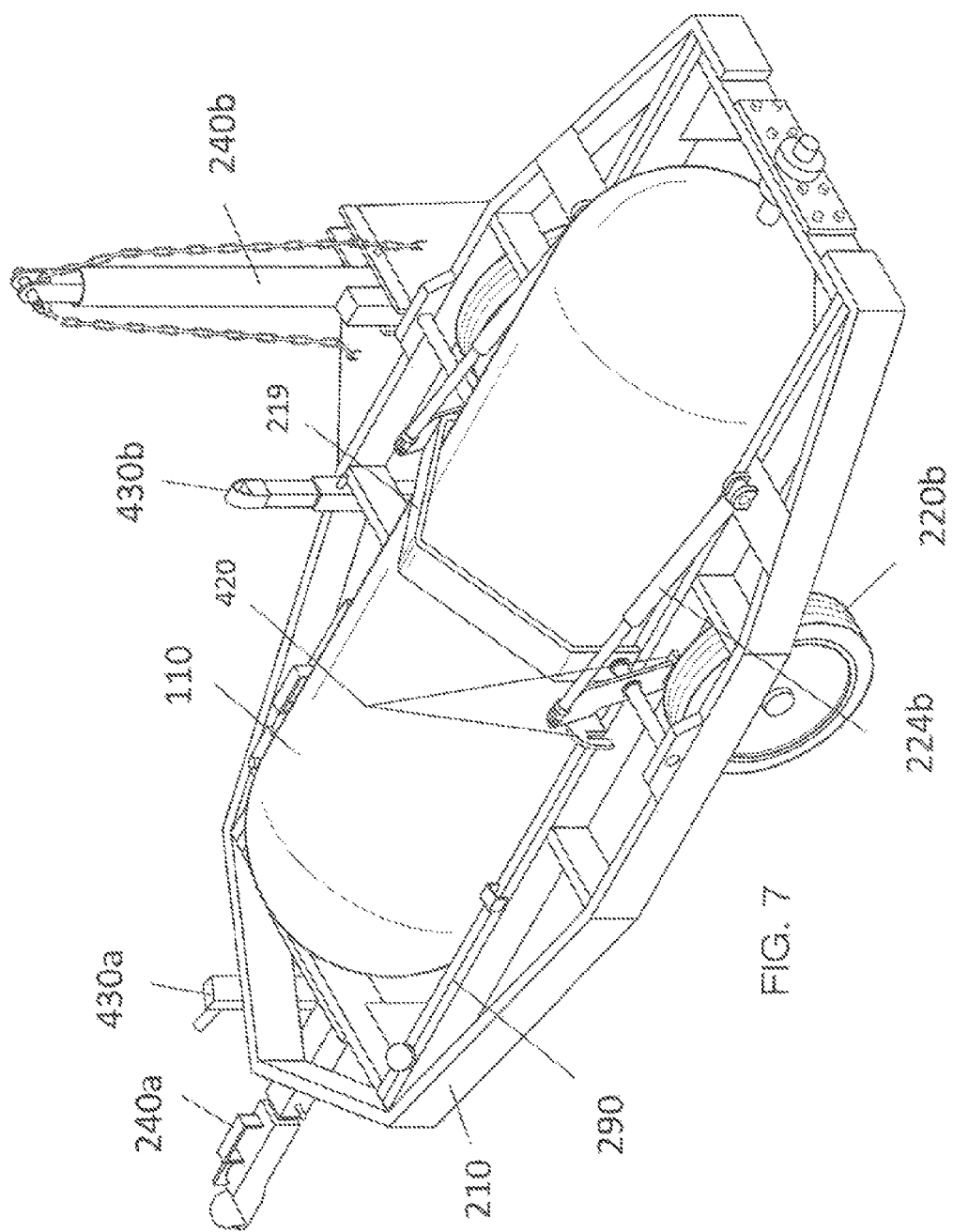
FIG. 7 is a back perspective view of the field roller device of the present invention.

As shown in FIG. 2, a center axle 230 traverses the length of the tank 110 from the first end to the second end. The first end of the center axle 230 engages the third side portion 210c of the tank frame 210 and the second end of the center axle 230 engages the fourth side portion 210d of the tank frame 210. The tank 110 can roll in at least a first direction (e.g., toward the first side portion 210a of the tank frame 210) and second direction (e.g., toward the second side portion 210b of the tank frame 210) about the center axle 230. The first end of the center axle 230 extends from the first end of the tank 110 and through the third side portion 210c of the tank frame 210, creating a first tow 240a, which can be used to connect to an agriculture vehicle (e.g., tractor 102). The second end of the center axle 230 extends from the second end of the tank 110 to the fourth side portion 210d of the tank frame 210.

The frame 210 comprises at least two retractable wheels 220 (e.g. a first retractable wheel 220a and a second retractable wheel 220b). The retractable wheels 220 are positioned such that the device 100 can be towed behind and agricultural vehicle (e.g., tractor 102) when the first tow 240a is hitched. In this configuration (e.g., see FIG. 1), the tank 110 is raised a distance off the ground surface via the retractable wheels 220, and the agricultural vehicle (e.g., tractor 102) can be used to transport the device 100 to a location as needed. Generally, the retractable wheels 220 allow the device 100 to be moved forwardly (e.g., in the direction of the first tow 240a and third side portion 210c of the tank frame 210) and backwardly (e.g., in the direction of the fourth side portion 210d of the tank frame 210).

In some embodiments, a dog house 219 (e.g., a bar) extends across the frame 210 from the first side portion 210a to the second side portion 210b. The dog house 219 may provide added strength for the frame, for example during roadway transport.

The retractable wheels 220 are attached to the frame via wheel braces 221, which are pivotally attached to the frame 210 (e.g., a first wheel brace 221a for the first retractable wheel 220a is pivotally attached to the first side portion of the frame 210 and a second wheel brace 221b for the second retractable wheel 220b is pivotally attached to the second side portion of the frame 210). The retractable wheels 220 can move between multiple positions (via the wheel braces 221) including an extended position (see FIG. 3) and a retracted position (see FIG. 4). When the retractable wheels 220 are in the extended position, the tank 110 is positioned a distance above the ground surface 101. When the retractable wheels 220 are in the retracted position, the tank 110 contacts the ground surface 101. The first wheel brace 221a of the first retractable wheel 220a is operatively connected to a first hydraulic cylinder arm 224a, and the second wheel brace 221b of the second retractable wheel 220b is operatively connected to a second hydraulic cylinder arm 224b. Hydraulic cylinders are well known to one of ordinary skill in the art. The hydraulic cylinder arms 224 control the movement of the retractable wheels 220 between the extended and retracted positions.

In some embodiments, one or more stops 420 are disposed on the frame 210 surrounding the hydraulic cylinder arms 224. The stops 420 function to limit movement of the hydraulic cylinder arms 224, preventing the arms 224 from moving the wheel braces 221 and wheels 220 to an incorrect position (e.g., beyond the intended position).

A second tow 240b (e.g., a fold up style hitch) is disposed on the first side portion 210a of the frame 210. The second tow 240b also allows the device to be attached to an agricultural vehicle (see FIG. 6). However, the agricultural vehicle (e.g., tractor 102) cannot be used to tow the device 100 when the retractable wheels 220 are in the extended position (as shown in FIG. 1), because the direction the agricultural vehicle (e.g., tractor 102) would pull would be perpendicular to the retractable wheels 220. The retractable wheels 220 must be moved to the retracted position in order for the device 100 to be towed from the second tow 240b. The second tow 240b is shown in its folded position in FIG. 7. The hitch 240b is able to rotate, for example along with the contour of the ground. For example, if the ground that is being rolled is uneven (e.g., from right to left), the hitch 240b can rotate so damage will not occur to the hitch 240b, for example if the angle becomes too steep.

In some embodiments, a first tow bar storage component 290a is disposed on the first side portion 210a of the frame 210. In some embodiments, a second tow bar storage component 290b, is disposed on the first side portion 210a of the frame 210. The tow bar storage components 290 may be used to hold tow bars 291, for example.

To use the device 100 of the present invention, the first tow 240a is hitched to the agricultural vehicle (e.g., tractor 102) with the wheels 220 in the extended position. The device 100 is towed to the desired location. Next, the wheels 220 are moved to the retracted position, causing the tank 110 to rest on the ground surface 101. The second tow 240b is hitched to the vehicle (e.g., tractor 102), and the vehicle pulls the device behind it, the tank 110 rotating over the ground surface 101 (see FIG. 6).

In some embodiments, the device 100 of the present invention further comprises a first jack 430a disposed on the third side portion 210c of the frame 210 near the first hitch 240a. The first jack 430a may be a wind up retractable jack. In some embodiments, a second jack 430b (e.g., a drop bar) is disposed on the first side portion 210a of the frame 210, for example near the first wheel 220a. In some embodiments, the second jack 430b has hydraulic hoses wrapped around it (e.g., the hoses attach to a hose attachment component 432 disposed on the second jack 430b).

The disclosures of the following U.S. Patents are incorporated in their entirety by reference herein: U.S. Pat. No. 4,389, 799; U.S. Pat. No. 6,968,907; U.S. Pat. No. 4,193,457; U.S. Pat. No. 6,539,697; U.S. Pat. No. 7,562,517.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A portable field roller device 100 comprising:
  (a) an elongated tank 110 having a first end and a second end;
  (b) a tank frame 210 for supporting the tank 110, the tank frame 210 surrounds side portions of the tank 110, the tank frame 210 has a first side portion 210a, a second side portion 210b, a third side portion 210c, and a fourth side portion 210d;

(c) a center axle 230 traverses the tank 110 from the first end to the second end, the first end of the center axle 230 engages the third side portion 210*c* of the tank frame 210 and the second end of the center axle 230 engages the fourth side portion 210*d* of the tank frame 210, the tank 110 can roll in at least a first direction toward the first side portion 210*a* of the tank frame 210 and second direction toward the second side portion 210*b* of the tank frame 210 about the center axle 230;

(d) a first retractable wheel 220*a* connected to the first side portion 210*a* of the tank frame 210 via a first wheel brace 221*a*, the first wheel brace 221*a* being pivotally attached to the first side portion 210*a* of the tank frame 210, and a second retractable wheel 220*b* connected to the second side portion 210*b* of the tank frame 210 via a second wheel brace 221*b*, the second wheel brace 221*b* being pivotally attached to the second side portion 210*b* of the tank frame 210;

(e) a first hydraulic cylinder arm 224*a* operatively connected to the first wheel brace 221*a*, and a second hydraulic cylinder arm 224*b* operatively connected to the second wheel brace 221*b*, the hydraulic cylinder arms 224 function to move the respective retractable wheels 220 between an extended position and a retracted position, when the retractable wheels 220 are in the extended position the tank 110 is raised a distance above a ground surface and when the retractable wheels 220 are in the retracted position the tank 110 rests on the ground surface;

(f) a first tow extending from the third side portion of the tank frame 210; and (g) a second tow disposed on the first side portion 210*a* of the tank frame 210.

2. The portable field roller device of claim 1, wherein the tank 110 is generally cylindrical.

3. The portable field roller device of claim 1 further comprising cross supports 212 for helping provide stability and durability to the tank frame 210.

4. The portable field roller device of claim 1 further comprising cross braces 214 for helping to support the tank 110 within the tank frame 210.

5. The portable field roller device of claim 1, wherein the second tow 240*b* is fold-tip-style tow.

6. The portable field roller device of claim 1 further comprising a dog house 219 extending across the tank frame 210 from the first side portion 210*a* to the second side portion 210*b*.

7. The portable field roller device of claim 1 further comprising a first tow bar storage component 290*a* is disposed on the first side portion 210*a* of the frame 210.

8. The portable field roller device of claim 1 further comprising a second tow bar storage component 290*b* is disposed on the first side portion 210*a* of the frame 210.

9. The portable field roller device of claim 1 further comprising a first jack 430*a* disposed on the third side portion 210*c* of the frame 210 near the first hitch 240*a*.

10. The portable field roller device of claim 9, wherein the first jack 430*a* is a wind up retractable jack.

11. The portable field roller device of claim 1 further comprising a second jack 430*b* disposed on the first side portion 210*a* of the frame 210.

* * * * *